March 22, 1966  V. L. SODERBERG  3,241,868
PRESSURE COMPENSATED BELLOWS JOINTS
Filed July 19, 1963  2 Sheets-Sheet 1

INVENTOR.
Victor L. Soderberg
BY
Ooms, McDougall and Hersh
Attorneys

United States Patent Office 3,241,868
Patented Mar. 22, 1966

3,241,868
PRESSURE COMPENSATED BELLOWS JOINTS
Victor L. Soderberg, Elgin, Ill., assignor to D.K. Manufacturing Company, Batavia, Ill., a corporation of Illinois
Filed July 19, 1963, Ser. No. 296,185
3 Claims. (Cl. 285—228)

This invention relates to bellows joints of the type utilizing flexible bellows sections made of convoluted or corrugated metal tubing or ducting. Such joints are employed to provide flexible coupling means between pipe or conduit sections so that a certain degree of angular movement between the sections will be possible. Such joints are also used as expansion joints to provide for expansion and contraction of the pipe or conduit sections with changes in temperature.

This invention pertains particularly to bellows joints which are compensated with respect to the internal pressure in the pipe or conduit, so that such internal pressure causes neither elongation nor contraction of the bellows joint. Simple bellows joints have the disadvantage that internal pressure tends to cause elongation of the joint. A pressure compensated bellows joint is so constructed that internal pressure is balanced or compensated for, so that the internal pressure causes neither elongation nor contraction of the joint.

One object of the present invention is to provide new and improved pressure compensated joints which employ three bellows or flex sections in a construction which is perfectly compensated with respect to internal pressure, yet affords a high degree of flexibility.

A further object is to provide a new and improved pressure compensated bellows joint which is so constructed that all of the bellows or flex sections are externally pressurized. In this way, the effective strength of the bellows is increased.

Another object is to provide a new and improved pressure compensated bellows joint in which all of the bellows or flex sections are enclosed and protected within an outer shell.

A further object is to provide a new and improved pressure compensated bellows joint in which all of the components may easily be made from sheet metal, and in which the components may be assembled in a straight forward manner without any assembly difficulty.

Further objects and advantages of the present invention will appear from the following description, taken with the accompanying drawings, in which.

Figure 1:
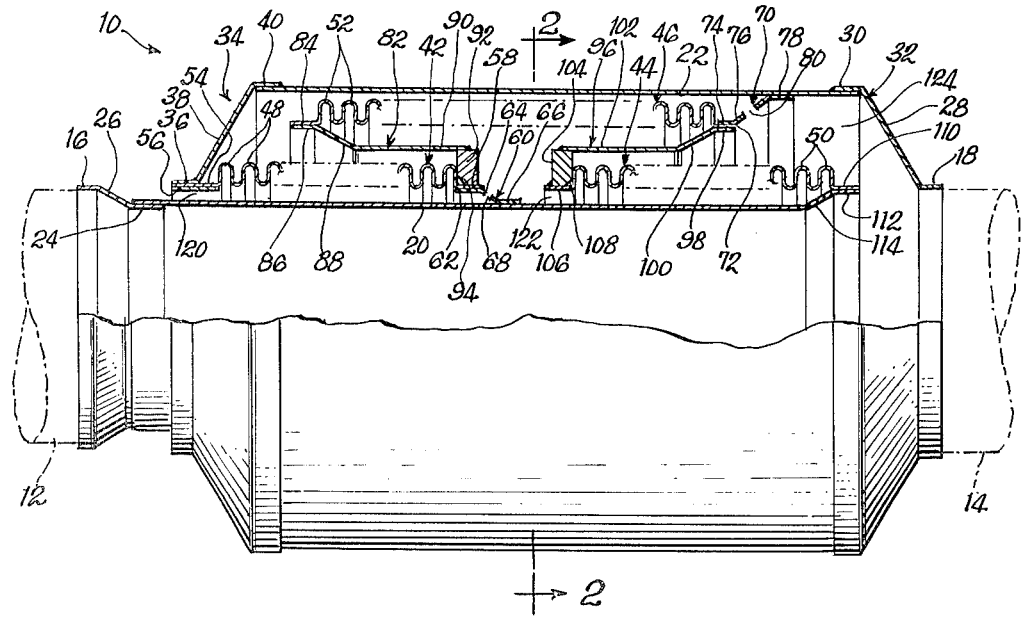
FIG. 1 is an elevational sectional view of a pressure compensated bellows joint to be described as an illustrative embodiment of the present invention.

As already indicated, the drawings illustrate a bellows joint 10 which is adapted to be connected between duct or pipe sections 12 and 14 so as to provide for a certain degree of angular movement between the pipe sections. The bellows joint 10 also provides for thermal expansion and contraction of the pipe sections 12 and 14.

The illustrated joint 10 is provided with opposite annular end members or couplings 16 and 18 adapted to be connected to the duct sections 12 and 14. As shown, the duct sections 12 and 14 may be slipped into the coupling members 16 and 18, which are substantially cylindrical in shape. The coupling members 16 and 18 may be welded or otherwise suitably secured to the duct sections 12 and 14.

As shown, the bellows joint 10 is provided with a generally cylindrical liner or inner tube 20 and a generally cylindrical shell or outer housing 22. It will be seen that the inner tube 20 is connected to the coupling member 16. As shown, the coupling member 16 has a reduced portion 24 which is slipped into and welded or otherwise secured to one end of the inner tube 20. A tapered frustoconical portion 26 extends between the cylindrical coupling portion 16 and the reduced cylindrical portion 24.

In the illustrated joint 10, the cylindrical shell or outer housing 22 is connected to the other coupling member 18. It will be seen that the cylindrical shell 22 is considerably larger in diameter than the coupling member 18. In this case, the coupling member 18 is formed integrally with a frustoconical end wall 28 which flares in diameter between the coupling member 18 and the outer shell 22. The larger end of the frustoconical end wall 28 is formed with an integral substantially cylindrical flange 30 which is slipped over the cylindrical shell 22 and welded or otherwise suitably secured thereto. The elements 18, 28 and 30 are preferably formed in one piece as an end member 32.

The opposite end of the cylindrical outer shell 22 is fitted with another end member 34 which is very similar to the end member 32. Thus, the end member 34 comprises a smaller cylindrical end portion 36, a frustoconical intermediate portion or end wall 38, and a larger cylindrical end portion 40. The end of the cylindrical shell 22 is slipped into the cylindrical end portion 40 and is welded or otherwise suitably secured thereto.

The illustrated bellows joint 10 is equipped with three bellows or flex sections 42, 44 and 46 which are connected directly or indirectly between the inner tube 20 and the outer shell 22. The bellows sections 42 and 44 are of the same diameter and are smaller in diameter than the bellows section 46. The bellows section 42 is formed with a series of circumferential convolutions or corrugations 48 so that the bellows sections will be flexible and will be capable of longitudinal elongation and contraction. As shown, the convolutions 48 are annular, but in some cases they may be spiral or helical. Similarly, the bellows sections 44 and 46 are formed with circumferential convolutions or corrugations 50 and 52. As shown, the bellows 42, 44 and 46 are made of metal, but other suitable materials, such as various plastics, may be employed if desired.

All of the components of the illustrated bellows joint 10 are preferably made of metal. This applies to the coupling members 16 and 18, the inner tube 20, the outer shell 22, and the end members 32 and 34, as well as the bellows sections 42, 44 and 46. However, in some cases, other suitable materials, such as various plastics, for example, may be employed.

In the illustrated construction, the first bellows section 42 is connected between the end member 34 and the inner tube 20. Thus, the left-hand end of the bellows section 42 is formed with a cylindrical end portion 54 which is received within and welded or otherwise suitably secured to the cylindrical end portion 36 of the end member 34. A reinforcing ring or bushing 56 may be secured within the end portion 54.

The right-hand end of the bellows section 42 is formed with a cylindrical end portion 58 which is connected to the inner tube 20 by means of a ring 60. Thus, the ring 60 has a larger cylindrical end portion 62 which is received within and welded or otherwise suitably secured to the end portion 58 of the bellows 42. It will be seen that the ring 60 has a frustoconical intermediate portion 64 which tapers between the cylindrical portion 62 and a smaller cylindrical end portion 66. In the illustrated construction, the end portion 66 is received closely around and welded or otherwise suitably secured to the inner tube 20. A passage or opening 68 is formed through the frustoconical portion 64 of the ring 60, for a purpose to be explained shortly. In many cases, a plurality of the openings 68 may be employed.

The right-hand end of the larger bellows 46 is connected to the outer cylindrical shell 22 by means of a ring 70. Thus, the right-hand end of the bellows 46 is formed with a cylindrical end portion 72 which is received around and welded or otherwise secured to a cylindrical portion 74 on the ring 70. As shown, the ring 70 has a frustoconical intermediate portion 76 which tapers between the cylindrical portion 74 and a larger cylindrical portion 78, which is closely received within and welded or otherwise suitably secured to the cylindrical outer shell 22. The frustoconical portion 76 of the illustrated ring 70 is formed with one or more openings or passages 80.

In the illustrated construction, the left-hand end of the bellows 46 is connected to the right-hand end of the bellows 42 by a ring 82. Thus, the left-hand end of the bellows 46 is formed with a cylindrical end portion 84 which is received around and welded or otherwise secured to a cylindrical end portion 86 on the ring 82. It will be seen that the ring 82 has a frustoconical intermediate portion 88 which tapers between the cylindrical portion 86 and a cylindrical end portion 90. In this case, the cylindrical portion is received around and welded or otherwise suitably secured to the outside of a solid metal ring 92. As shown, the inside of the ring 92 is received around and welded or otherwise suitably secured to the outside of the cylindrical end portion 58 of the bellows 42. The ring 92 serves as a spacer and connector, to space the cylindrical portion 90 outwardly from the bellows 42. The ring 92 has an inner circular edge 94 which is chamfered or beveled so as to avoid any interference with the flexing movement of the bellows 42.

In the illustrated construction, another ring 96, very similar to the ring 82, is connected between the right-hand end of the larger bellows 46 and the left-hand end of the smaller bellows 44. Thus, the ring 96 has a larger cylindrical end portion 98 which is received within and welded or otherwise suitably secured to a cylindrical end portion 72 of the bellows 46. The illustrated ring 96 has a frustoconical intermediate portion 100 which tapers between the cylindrical portion 98 and a smaller cylindrical end portion 102. It will be seen that the cylindrical end portion 102 is received around and welded or otherwise suitably secured to the opposite side of a solid ring 104 which is very similar to the ring 92. The inside of the ring 104 is received around and welded or otherwise suitably secured to a cylindrical portion 106 formed on the left-hand end of the bellows 44. The ring 104 has a beveled or chamfered annular inner edge 108 adjacent the bellows 44, to avoid any interference with the flexing of the bellows.

The right-hand end of the bellows 44 is connected to the right-hand end of the inner tube 20. Thus, the right-hand end of the bellows 44 is formed with a cylindrical end portion 110 which is received around and welded or otherwise suitably secured to an enlarged cylindrical end portion 112 on the inner tube 20. A frustoconical portion 114 tapers between the cylindrical end portion 112 and the main part of the inner tube 20. The portions 112 and 114 are illustrated as being formed integrally with the inner tube 20.

In operation, atmospheric pressure is admitted to the insides of all three bellows 42, 44 and 46. The outsides of all the bellows are supplied with whatever fluid pressure exists within the conduit sections 12 and 14. Normally, the pressure within the conduit sections 12 and 14 would be greater than atmospheric pressure, although in some cases a subatmospheric pressure or vacuum may exist within the conduit sections 12 and 14. For the purposes of general discussion, it will be assumed that the fluid pressure within the conduit sections 12 and 14 is greater than atmospheric pressure. Thus, the bellows 42, 44 and 46 are loaded radially in compression rather than in tension. Such compressive loading is more favorable than loading in tension, so that the effective strength of the bellows is enhanced.

The bushing 56 which is received within the left-hand end portion 54 of the bellows 42 is larger in inside diameter than the outside diameter of the inner tube 20, so that a clearance space 120 is provided, through which atmospheric pressure is supplied to the inside of the bellows 42. Atmospheric pressure is applied to the inside of the larger bellows 46 through the openings 68 in the ring 60. These openings 68 extend between the space within the bellows 42 and the space within the bellows 46. The left-hand cylindrical end portion 106 of the bellows 44 is larger in inside diameter than the outside diameter of the inner tube 20, so that a clearance space 122 is provided through which atmospheric pressure is applied to the inside of the bellows 44. The clearance space 122 extends between the space within the bellows 46 and the space within the bellows 44.

Fluid pressure from the inside of the conduit 14 is applied to the outside of the bellows 44 through the large annular space 124 between the outer shell 22 and the right-hand end portion 112 of the inner tube or liner 20. The openings 80 in the ring 70 are effective to apply such fluid pressure to the outside of the larger bellows 46. It will be recognized that the internal fluid pressure is applied to the entire inside of the outer shell 22. It will be seen that the outside of the bellows 42 is exposed to the fluid pressure within the left-hand portion of the outer shell 22, so that the fluid pressure in the conduit 14 is applied to the outside of the bellows 42.

The fluid pressure within the conduit sections 12 and 14 develops a force which tends to push the conduits 12 and 14 away from each other longitudinally, and thus tends to elongate the bellows joint 10. However, such force is balanced by the force produced by fluid pressure on the rings 82, 92, 96 and 104. It will be recalled that fluid pressure is applied to the left-hand sides of the rings 82 and 92, while atmospheric pressure exists upon the right-hand sides of such rings. Thus, the fluid pressure tends to push the rings 82 and 92 to the right. This push is transmitted to the inner tube 20 by the ring 60.

Similarly, the fluid pressure tends to push the rings 96 and 104 to the left. This push is transmitted to the outer shell 22 by the ring 70. Thus, the action of fluid pressure on the rings 82, 92, 96 and 104 tends to compress the bellows joint 10 axially, and thus tends to balance or compensate for the normal tendency of fluid pressure to elongate the joint. The effective areas of the rings 82, 92, 96 and 104 are chosen, in the normal case, so that the joint is perfectly compensated and is neither elongated nor contracted by the application of fluid pressure. However, if desired, the joint may be either undercompensated or overcompensated. If the joint is undercompensated, there will still be some tendency for the joint to elongate when fluid pressure is applied. If the joint is overcompensated, there will be a tendency for the joint to contract when fluid pressure is applied.

It will be recognized that the three bellows impart a high degree of flexibility to the joint, so as to provide for angular movement between the conduit sections 12 and 14. The bellows also provide for axial movement between the conduits 12 and 14 due to such factors as thermal expansion and contraction. If the conduit sections 12 and 14 move toward each other due to thermal expansion or contraction, the larger bellows 46 is compressed axially, while the smaller bellows 42 and 44 are extended axially. Conversely, any movement of the conduit sections 12 and 14 away from each other tends to extend the bellows 46, while compressing the bellows 42 and 44 axially.

It will be recognized that all of the components of the bellows joint 10 are easy to manufacture. The bellows 42, 44 and 46 may be made by any of the usual methods of convoluting thin-walled ducting or tubing. All of the other components may readily be made from sheet metal or thin-walled ducting, except that the solid rings 92 and 104 are normally made by casting or machining operations.

It will be recognized by those skilled in the art that the bellows joint 10 can readily be assembled by straightforward assembly procedures. During the assembly operations, all joints to be welded are readily accessible. It will be noticed that the end portions 54 and 58 of the bellows 42 are smaller in inside diameter than the inside diameter of the convolutions 48, so that the bellows may readily be slipped over the ring 60. Similarly, the inside diameter of the convolutions 50 of the bellows section 44 is greater than the inside diameter of the end portions 106 and 110 so that the bellows may be slipped easily over the end portion 112. In the case of the bellows 46, the inside diameter of the convolutions 52 is greater than the inside diameter of the end portions 84 and 72 so that the bellows may easily be slipped over the end portions 86 and 98 of the rings 82 and 96.

Figure 2:
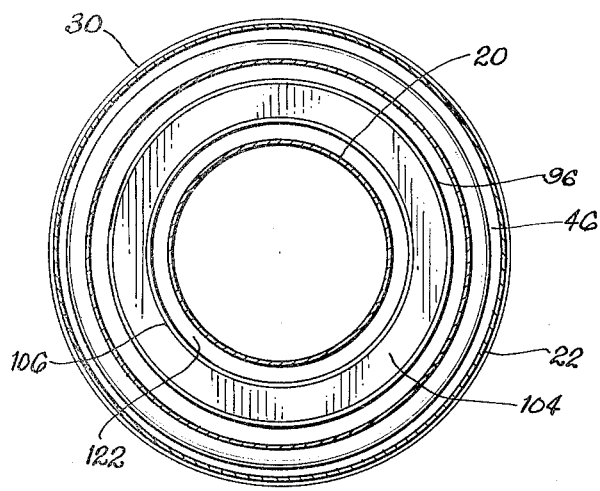
FIG. 2 is a cross section taken generally along the line 2—2 in FIG. 1.
Figure 4:
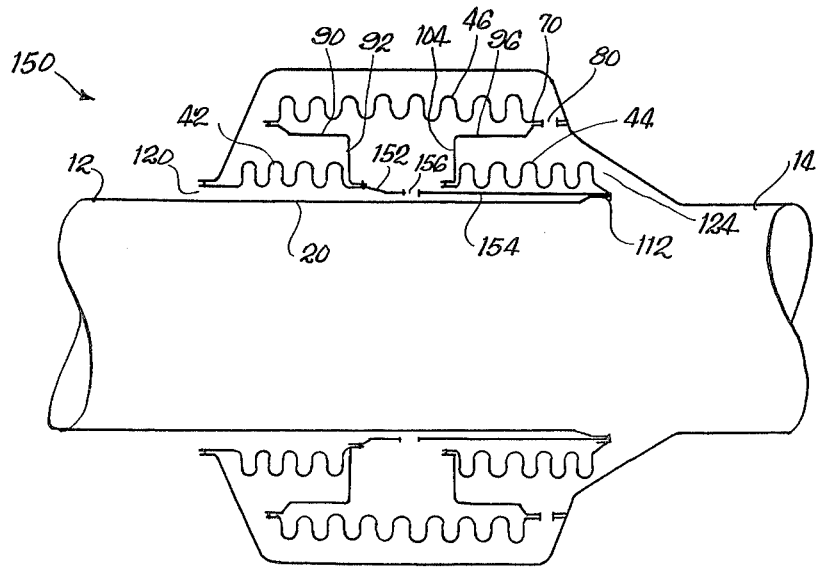
FIG. 4 is a diagrammatic view similar to FIG. 3 but showing a modified bellows joint.
Figure 3:
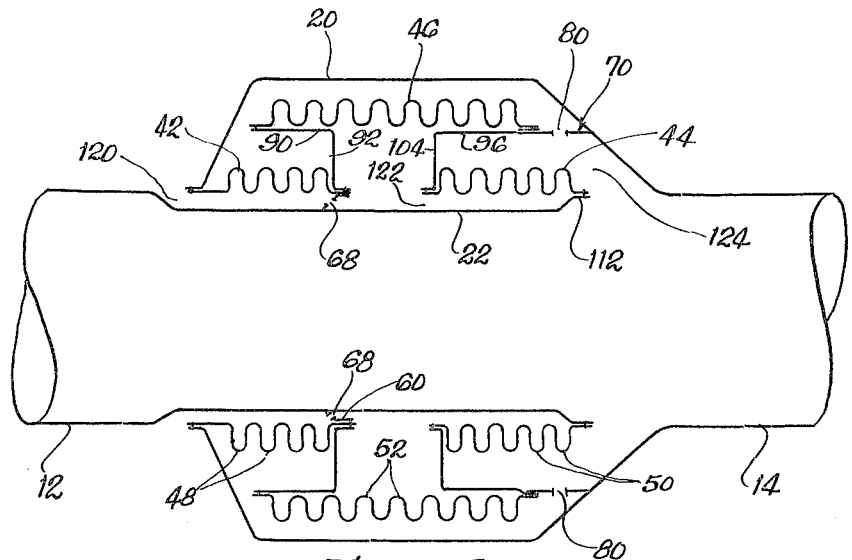
FIG. 3 is a diagrammatic sectional representation of the joint of FIGS. 1 and 2.

FIG. 4 is a diagrammatic representation of a slightly modified bellows joint 150. The bellows joint 150 is essentially the same in almost all respects as the bellows joint 10. Corresponding components are given the same reference characters in FIG. 4 as in FIGS. 1–3. The bellows joint 150 differs from the bellows joint 10 in that the ring 60 of FIGS. 1–3 is replaced with a ring 152 which is much longer than the ring 60. The ring 152 is connected between the right-hand end of the bellows 42 and the extreme right-hand end portion 112 of the inner tube 20. It will be seen that the ring 152 has an elongated cylindrical portion 154 which extends within the entire length of the bellows 44. One or more openings 156 are formed in the ring 152 to admit atmospheric pressure to the insides of the bellows 44 and 46. If desired, the inner tube 20 may be formed integrally with the conduit section 12.

Various other modifications, alternative constructions and equivalents may be employed without departing from the true spirit and scope of the invention, as exemplified in the foregoing description and defined in the following claims:

I claim:
1. In a bellows joint,
the combination comprising first and second annular end members at first and second ends of the joint for connecting the joint between conduit sections,
an inner housing connected to said first end member and extending therefrom toward said second end of the joint,
an outer housing connected to said second end member and extending therefrom toward the first end of the joint,
said outer housing being spaced outwardly from and received around said inner housing,
first, second and third bellows positioned between said inner and outer housings,
said first and second bellows being arranged end to end and being spaced outwardly from said inner housing,
said third bellows being larger in diameter than said first and second bellows and being spaced inwardly from said outer housing and radially outward of said first and second bellows,
each of said bellows having a first end directed toward said first end of the joint and a second end directed toward said second end of the joint,
a first annular wall member connected between said first end of said third bellows and said second end of said first bellows,
a second annular wall member connected between said second end of said third bellows and said first end of said second bellows,
a third annular wall member connected between said second end of said second bellows and said inner housing,
a fourth annular wall member connected between the second end of said first bellows and said inner housing,
said first bellows, said fourth annular wall member and said inner housing forming a first chamber in communication with the interior side of said first bellows,
said first bellows at the first end thereof being radially outwardly spaced from said inner housing and affording communication between the atmosphere and said first chamber,
said second and third bellows and said first, second, third and fourth annular wall members forming a second chamber in communication with the interior sides of said second and third bellows,
said fourth annular wall member having an opening therein extending between said first and second chambers and affording communication between said second chamber and the atmosphere,
a fifth annular wall member connected between the first end of said first bellows and said outer housing,
and a sixth annular wall member connected between said second end of said third bellows and said outer housing,
said second bellows, said second annular wall member, said sixth annular wall member and said outer housing forming a third chamber in communication with the exterior side of said second bellows,
said second bellows being spaced at its said second end thereof from said outer housing for establishing communication between the interior of said inner housing and said third chamber to apply the fluid pressure from the interior of said inner housing to the exterior side of said second bellows,
said first and third bellows, said outer housing and said first, fifth and sixth annular wall members forming a fourth chamber in communication with the exterior sides of said first and third bellows,
said sixth annular wall member having an opening therein affording communication between said third and fourth chambers to apply the fluid pressure from the interior of said inner housing to the exterior sides of said first and third bellows,
the effective cross-sectional areas of each of said wall members which are disposed in pressure opposition being so proportioned in relation to the effective cross-sectional areas of said bellows that the action of the fluid pressure acting on said opposed annular wall members and said bellows is effective to compensate for the tendency of the joint to elongate due to fluid pressure.

2. The combination of claim 1,
in which said fourth annular wall member comprises a tube extending along the space between said inner housing and said second bellows.

3. The combination of claim 1,
in which said fourth annular wall member comprises an annular ring connected between said inner housing and said second end of said first bellows.

(References on following page)

References Cited by the Examiner

UNITED STATES PATENTS 2,873,984 2/1959 Andersen _____ 285—228
2,942,896 6/1960 Hill _____ 285—228

FOREIGN PATENTS 262,367 10/1949 Switzerland.

OTHER REFERENCES

The Effect of Pressure on the Bending Characteristics of an Actuator System by Paul Seide, Journal of Applied Mechanics, September 1960, volume 27, Series E, Number 3, pages 429–437.

CARL W. TOMLIN, *Primary Examiner*.